Oct. 31, 1933.   A. PETELER   1,932,475
SUN SHIELD
Filed Dec. 10, 1932   2 Sheets-Sheet 1
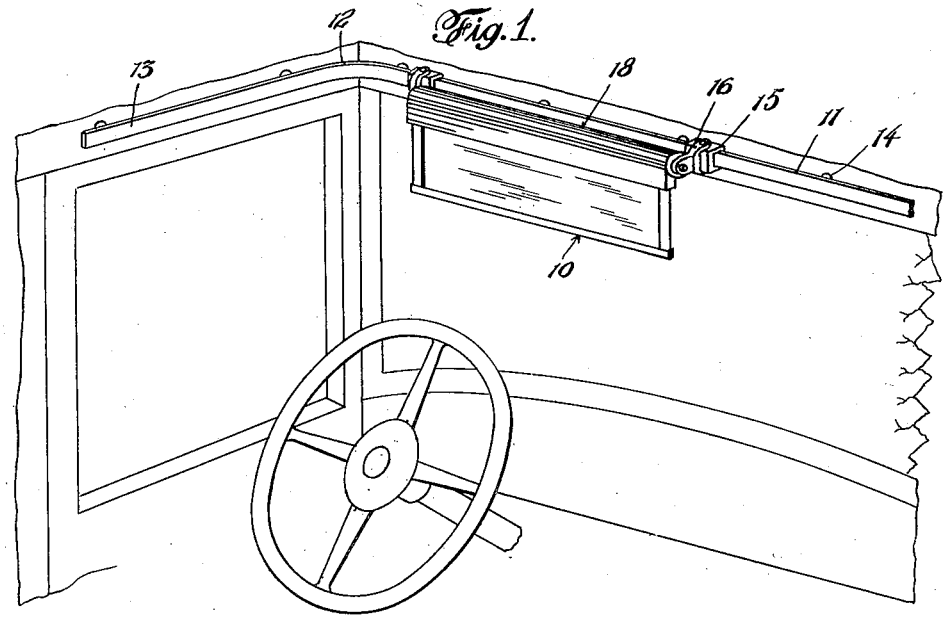
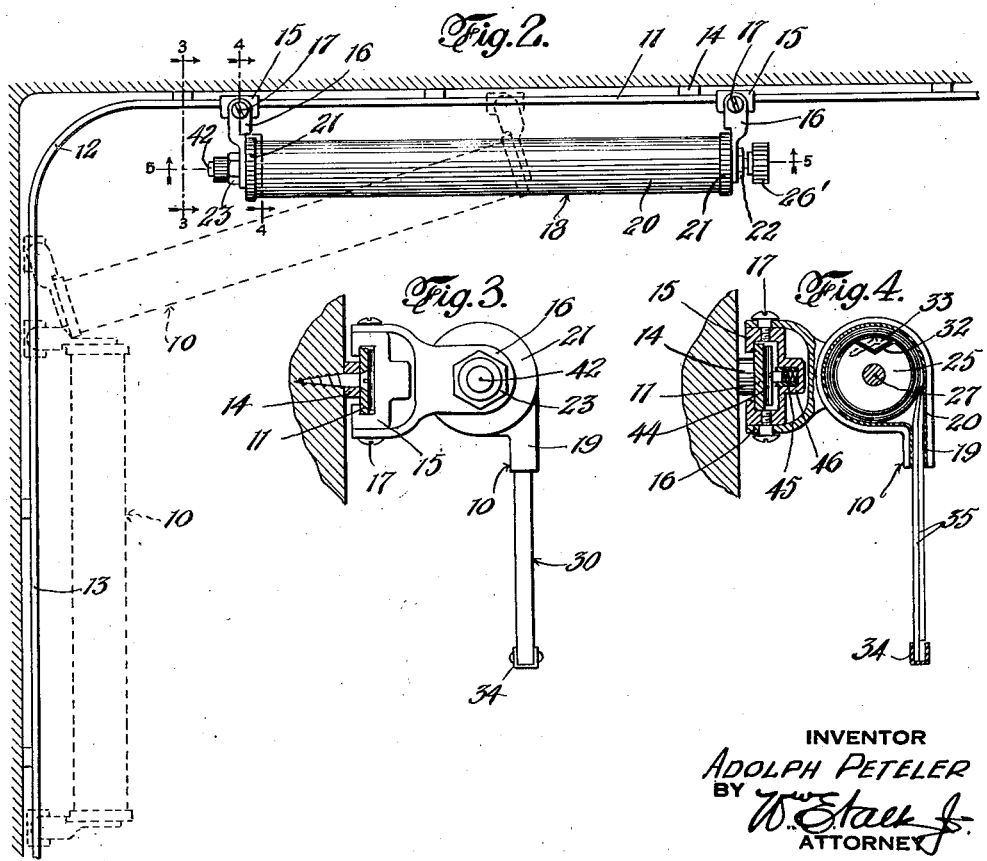
INVENTOR
ADOLPH PETELER
BY
ATTORNEY Oct. 31, 1933.  A. PETELER  1,932,475
SUN SHIELD
Filed Dec. 10, 1932  2 Sheets-Sheet 2
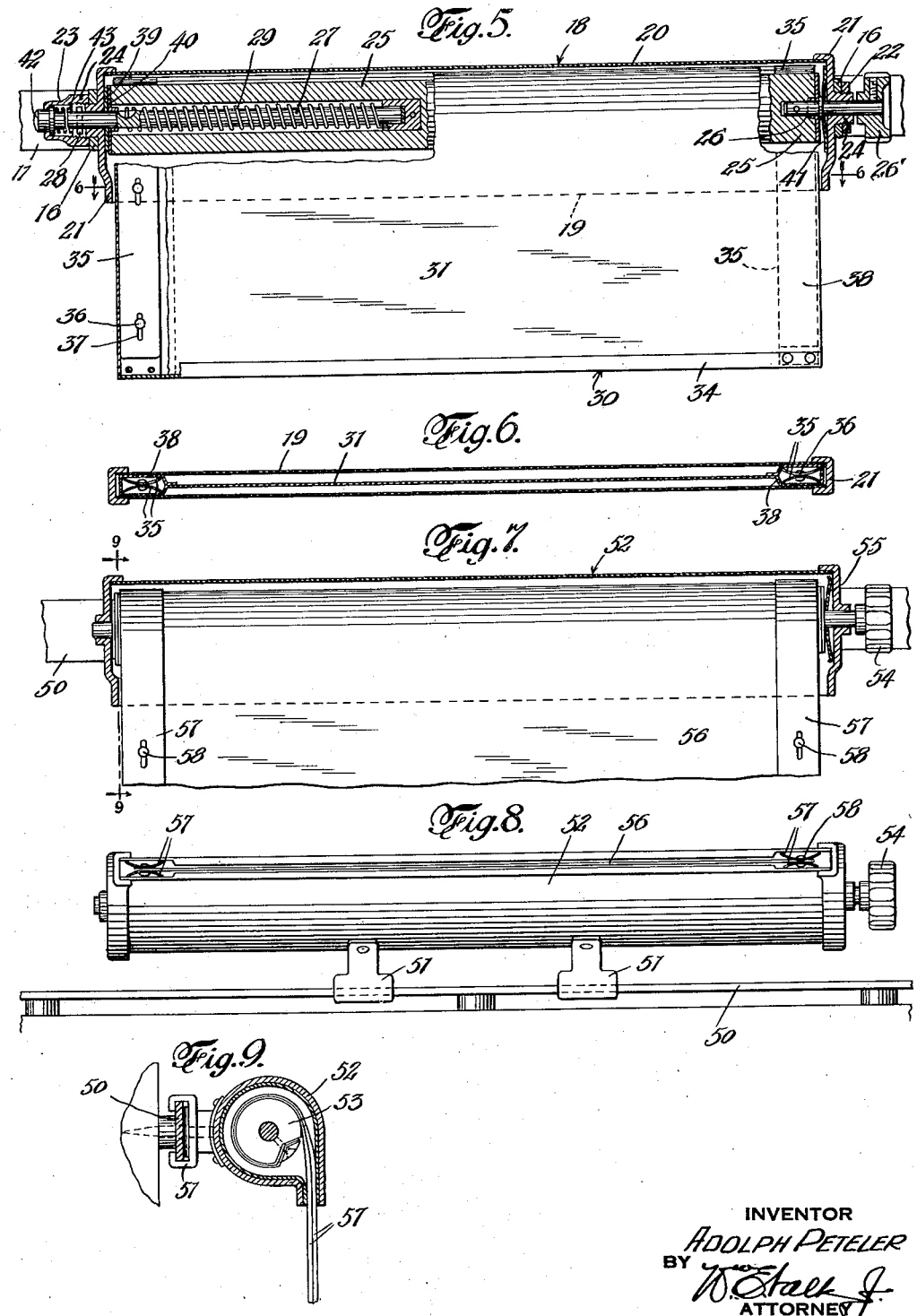

Patented Oct. 31, 1933

1,932,475

UNITED STATES PATENT OFFICE 1,932,475

SUN SHIELD

Adolph Peteler, Freeport, N. Y.

Application December 10, 1932
Serial No. 646,591

9 Claims. (Cl. 296—97)

My invention relates to sun shields, and more particularly to roll type sun shields for automotive vehicle use.

An object of the invention is to provide an adjustable type sun shield in which the shield per se, when not required to be used, may be rolled on a roller, and the roller shifted bodily (whether the shield be rolled or unrolled) from one to a variety of selected operative positions.

A further object of the invention is to so mount the sun shield as to admit of its being shifted from a position in front of to a position at one side of the driver of the machine.

A further object of the invention is to so construct the shield per se as to admit of the use in the body thereof of one or more resilient reinforcing strips, said strips, when rolled, exerting a force tending to unroll the shield, and said strips, when unrolled, giving adequate stiffness and rigidity to the shield to prevent it from flopping, bending and twisting.

A further object of the invention is to embody in a roll type sun shield a spring actuated roller upon which the shield is adapted to be rolled, the action of said spring being opposed at all times by the action of said resilient means, and the forces in each case being preferably equal and opposite.

Other and further objects and advantages of the invention, such, for instance, as the provision of a friction lock for the roller, the provision of divided reinforcing strips of curved cross section, etc., will be hereinafter more fully set forth.

In the drawings, wherein like reference characters denote like or corresponding parts:

Fig. 1 is a perspective view showing the preferred installation;

Fig. 2 is a plan view;

Fig. 3 is a section on the line 3—3 of Fig. 2;

Fig. 4 is a section on the line 4—4 of Fig. 2;

Fig. 5 is a section on the line 5—5 of Fig. 2;

Fig. 6 is a section on the line 6—6 of Fig. 5;

Fig. 7 is a view similar to Fig. 5 showing a modification;

Fig. 8 is an inverted plan view of the modification of Fig. 7; and

Fig. 9 is a section on the line 9—9 of Fig. 7.

The sun shield is shown installed on the inside of an automobile body directly behind and above the windshield, and is adapted to be shifted to various selected positions of adjustment both crosswise the windshield, as well as crosswise the door at the driver's left. In Fig. 2 of the drawings, three positions of adjustment are indicated.

The shield in its entirety, is designated as 10. It is mounted for movement along a suitable rail or track 11 fastened to the automobile body frame structure. The rail 11 extends either partly or the full distance across the top of the windshield, and is curved as at 12 to follow the body contour for some little distance across the top of the door as indicated at 13. Thus mounted, it can be adjusted to shield the eyes of the driver of the vehicle regardless of the angle from which the sun's rays approach. Blocks 14 hold the rail 11 spaced slightly from the structure of the body frame.

Mounted on the rail 11 are two slide fittings 15. These fittings ride along the rail and are so shaped as to receive the rail within their embrace. The spacing of the fittings is determined by the over-all length of the shield and the shield and fittings, when assembled, slide as a single unit.

Each fitting 15 has fastened thereto a bracket 16. The brackets are the same in size and shape. Viewed from the side (see Fig. 3), each bracket is shaped to straddle its associated fitting, and is pivoted as at 17 to swing freely about an axis at right angles to the longitudinal axis of the rail. In thus pivoting the brackets 16, the shield 10, which is supported at its opposite ends by said brackets, is enabled to be shifted into various angular positions with respect to the rail 11 as the fittings 15 are moved along the curved portion 12 of its length.

Between the brackets 16 the casing 18 of the shield is firmly held. Said casing 18 is of generally circular section except for an extension 19 projecting tangentially out from the casing wall. It comprises a tubular open-ended body 20 over the open ends of which are fitted end caps 21. These end caps are shaped to fit over the body ends and the casing in its entirety is held firmly between the brackets 16 by the forced engagement of said brackets against said caps. To secure said brackets against the end caps an ordinary nut 22 on the one hand, and a cap nut 23 on the other, are provided. The nuts 22 and 23 are fitted over externally threaded bosses 24 projecting out from the outer faces of said caps.

Within the bosses 24 a roller 25 is journalled for rotation. Said roller is supported at its opposite ends by means of a trunnion 26 and a shaft 27. Throughout a portion of its length it is hollowed out, and into said hollow the shaft 27 extends. Said shaft is mounted to rotate at its inner end, and at its outer end it is extended through and beyond its journal, where it is pinned or keyed as at 28 to the bracket 16. On the outer end of the trunnion 26 a finger knob 26' is fastened.

There is also mounted in the hollow of the roller 25 a spring 29 which is fastened to the roller and to the shaft 27 at its opposite ends. The function of the spring 29 is to exert a force tending to wind the roller when the shield per se is extended or unrolled.

The shield per se, designated as 30, comprises a sheet 31 of flexible material such as celluloid, rubberized cloth other suitable fabric. It is fastened along one edge to the roller 25 by its fitting engagement in a groove 32 formed in the outer surface of the roller. Said groove 32 is substantially coextensive with the roller and is adapted to receive a complemental strip 33 between which and the wall of said groove the edge of the sheet 31 is fastened.

To lend stiffness to the sheet or shield per se, when extended or unrolled, said sheet is suitably reinforced. The reinforcing means (see Figs. 5 and 6) consists of two or more resilient strips of material such as very light gage spring steel or any other resilient metal having similar characteristics. Thin or light gage spring steel, appropriately tempered, is preferred, however, because of its inherent resiliency and its tendency to return to its original shape when rolled, twisted or otherwise deformed through bending.

The two strips shown are disposed along and coextensive with the edges of the sheet 31 and are capable of being freely rolled upon the roller 25 along with the flexible sheet material. Thus disposed, said strips at all times keep the unrolled section of the material taut and sufficiently stiff or rigid longitudinally of its length to prevent the shield from buckling, bending and flopping. Transverse stiffness is obtained by means of an outer edge channel piece 34 extending from one to the other of the resilient strips along the outer edge of the material. This strip 34 serves also as a handle or grip by means of which the shield may be grasped and rolled or unrolled as desired.

The resilient edge strips are designated as 35 and are preferably arranged in pairs and in parallelism. That is to say, each strip 35 is divided longitudinally of its length and comprises two strip pieces. These individual strip pieces are characterized by an arcuate or curved cross section and the pieces comprising the respective pairs or unit strips are preferably disposed back-to-back with their convex faces adjacent. Thus organized, said pieces lend substantial rigidity to the sheet material and at the same time, due to their inherent resiliency, exert at all times, when flattened out or rolled, a force acting in opposition to the force exerted by the spring 29. Where perfect balance between the forces is obtained, the shield, in all positions of rolled adjustment, tends to remain in its selected adjusted position.

As intimated, the strips 35 are adapted to roll on the roller 25 along with the sheet material. As roll occurs, the strip pieces of the unit strips, bearing one upon the other, flatten out, and once flattened, offer little or no resistance to continued winding or rolling movement. They do exert, however, at all times, a tendency to unroll, straighten out longitudinally and regain, in cross section, that degree of curvature to which they are originally permanently set. It is this force or tendency to straighten out upon which reliance is placed to counteract the winding urge of the roller spring 29 and at the same time hold the sheet material substantially stiff, taut and virtually rigid. To hold the strip pieces together and yet permit creeping of the one upon the other as they are rolled and unrolled, pins or rivets 36 are fastened to one strip piece and are let through slots 37 formed in the other. Further uniting of the strip pieces comprising the respective pairs is obtained by wrapping the material of the sheet 31 around the strips as indicated at 38 in Fig. 6.

When the forces exerted by the spring 29 and the reinforcing strips 35 are equal and opposite, there is no necessity for providing a roller lock. Perfect balance, however, between the respective forces cannot always be maintained. For this reason, a simple though effective roller lock mechanism is shown. Preferably, said lock mechanism comprises a friction disc 39, a cooperating end plate or friction disc 40 and a leaf spring 41. The two discs 39 and 40 are disposed at one end of the roller 25, whereas the leaf spring 41 is disposed at the opposite roller end. The spring, it will be observed, exerts a force axially of the roller, and, since the discs 39 and 40 are carried by the roller and by one of the brackets 19, respectively, the desired friction contact between the cooperating discs is thus maintained. To release the lock it is only necessary that the spring 41 be flattened. This may be accomplished by means of a plunger 42 mounted in the cap nut 23 at one end of the casing 18. In Fig. 5 the manner in which the plunger 42 is mounted is clearly shown. A spring 43 acts on said plunger to constantly urge it and the shaft 27 apart.

As a means to prevent rattling of the fittings 15 on the rail, as well as to frictionally lock the shield as a unit in its adjusted position, a friction shoe or block 44, spring-pressed as at 45, is provided for each fitting. The shoes in each instance are mounted within the fittings 15 and are adapted to frictionally engage the inner face of the rail. Said fittings (see Fig. 4) are suitably enlarged as at 46 to accommodate said springs.

It will be seen from the above that the sun shield is freely adjustably lengthwise the supporting rail and that in any and all positions of adjustment it is automatically frictionally locked to remain stationary. It may also be pointed out that the position of the casing 18, and the roller within said casing, may be reversed. This is accomplished by backing off the nuts 22 and 23 at the casing ends and turning the casing completely around. In doing this, the tangential extension 19, instead of projecting out from the casing parallel with the windshield at some little distance therefrom, may be made to extend out from said casing parallel with the windshield in closer proximity to it. Such adjustment also makes it possible to maintain a setting in which the sun shield, when extended, is at all times disposed parallel with the windshield regardless of the angle at which the windshield itself is set.

The construction of the modified sun shield of Figs. 7, 8 and 9 will now be described. From a broad aspect the two types of sun shield are generally similar. In the modified type sun shield no provision is made for around-a-corner adjustment. The track 50 is mounted at the top of the windshield and has slidably mounted thereon two fittings 51. These fittings are directly fastened to a suitable casing 52. The casing 52 and the roller 53 mounted therein are the same in construction as the casing 18 and the roller 25 of the preferred type. Said roller 52 is provided at one end with a finger knob 54 and a spring 55. No provision, however, is made for depressing said spring except through movement of the finger knob. The principal difference between the two types of shield is to be found in the construction of the shield per se. In the modified type shield the sheet material 56 of the shield per se, instead of being carried around the reinforcing strips, is extended between the strip pieces 57 where it is fastened as at 58. The nature of the fastening is preferably such that the sheet 56 as well as the strip pieces 57 may creep one upon the other. In all other essential respects, the two types of shield are substantially identical.

In conclusion, it should be noted that the tangential extension 19 thru which the reinforcing strips project, is so formed and dimensioned as to act at all times as a guide for the shield per se as well as for the reinforcing strips. In other words, the reinforcing strips by their fitting engagement in said extension are rigidly supported at one end of the shield, when extended, and the shield itself directed and extended off from the casing 18 at the desired angle. The reinforcing strips, once released from the grasp of the extension 19, extend out straight therefrom at the angle selected by the extension setting. Due to the resiliency of said reinforcing means, and the tendency of said strips to seek at all times a straight line position, the shield, when extended, is maintained taut, relatively stiff and virtually rigid.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. As an article of manufacture, a roll type shield having fastened thereto a reinforcing means, said reinforcing means comprising resilient strip pieces of curved cross section adapted to be fastened back to back with the convex faces thereof adjacent.

2. A roll type glare shield for automotive vehicles including a re-enforced sheet of flexible material, the reenforcement consisting of one or more pairs of resilient strip pieces fastened to each other and to said sheet, said strip pieces being adapted to roll and unroll with said sheet and to creep longitudinally one upon the other as said shield is rolled and unrolled.

3. A roll type glare shield for automotive vehicles including a re-enforced sheet of flexible material, the reenforcement consisting of one or more pairs of resilient strip pieces of curved cross section fastened back-to-back with their convex faces adjacent and to said sheet, said strip pieces being adapted to roll and unroll with said sheet and to flatten out when rolled, and the fastening being such that said strip pieces are permitted to creep longitudinally one upon the other in the rolling and unrolling of the shield.

4. A roll type glare shield for automotive vehicles including a reinforced sheet of flexible material, the reinforcement consisting of one or more pairs of resilient thin gauge metallic strip-pieces fastened to each other and to said sheet, said strip-pieces being adapted to roll one upon the other with said sheet and to creep longitudinally one upon the other as said sheet is rolled and unrolled, one strip-piece of each said pair having formed therein one or more longitudinally extending slots, and pins fastened to the other said strip-piece of each said pair adapted to engage within said slots to hold said relatively movable strip-pieces of the respective pairs together.

5. A roll type glare shield for automotive vehicles including a reinforced sheet of flexible material, the reinforcement consisting of two pairs of resilient strip-pieces fastened to each other and to said sheet adjacent to its opposite longitudinal edges, said strip pieces being adapted to roll and unroll with said sheet and to creep longitudinally one upon the other as said sheet is rolled and unrolled, and a cross strip fastened to said sheet and to one strip-piece only of said pairs, said cross strip providing for said sheet an outer edge reinforcement.

6. A roll type glare shield for automotive vehicles including a reinforced sheet of flexible material, the reinforcement consisting of two or more pairs of resilient strip-pieces of curved cross section fastened back to back with their convex faces adjacent, said strip-pieces being adapted to roll and unroll with said sheet and to flatten out when rolled, and envelopes of flexible material fastened to said sheet and within the embrace of which said pairs of strip-pieces are fitted, the material of the envelopes, when said sheet is unrolled, being held taut by the expanding tendency of the pairs of curved section strips.

7. In a roll type glare shield for automotive vehicles, a shield of non-metallic inherently flexible sheet material having fastened thereto adjacent to its opposite longitudinal edges relatively stiff though resilient thin gauge tempered metallic reinforcing strips of curved cross section, said strips, together with a cross strip extending from one to the other thereof at the outer edge of said sheet material providing for said sheet material a frame which, in and of itself, lends to said sheet material adequate stiffness and rigidity to prevent said sheet material, when unrolled, from flopping, twisting and buckling; a roller upon which said sheet material and said reinforced strips are adapted to be rolled, and a casing for said roller having formed therein a guide opening so dimensioned as to receive snugly within its embrace said reinforced edge strips, said casing providing for said reinforced sheet material, whether rolled or unrolled, its sole and only support.

8. In a roll type glare shield for automotive vehicles, a casing, a roller within said casing, a shielding sheet adapted to be rolled upon said roller, reinforcing means fastened to said sheet adapted in and of itself to lend to said sheet adequate stiffness and rigidity to prevent said sheet, when unrolled, from flopping, twisting and buckling, and an open-ended tangential guide extension formed upon said casing and through the open outer end of which said reinforced sheet is adapted to extend, said outer open end being so dimensioned as to receive and firmly hold within its embrace said reinforced strips and hence said sheet material.

9. In a roll type glare shield for automotive vehicles, a casing, a support for said casing, said casing being rotatably adjustable relatively to said support, a roller within said casing, a shielding sheet adapted to be rolled upon said roller, reinforcing means fastened to said sheet adapted in and of itself to lend to said sheet adequate stiffness and rigidity to prevent said sheet, when unrolled, from flopping, twisting and buckling, and a guide extension for said sheet formed integrally with said casing, said guide having an outer end opening adapted to snugly embrace and firmly hold said reinforcing means and hence said sheet at that angular position pre-selected through adjustment of said casing.

ADOLPH PETELER.